United States Patent [19]

Way

[11] Patent Number: 4,560,393
[45] Date of Patent: Dec. 24, 1985

[54] METHOD OF AND ARRANGEMENT FOR ENRICHING THE NITROGEN CONTENT OF AN EFFLUENT GAS IN A PRESSURE SWING ADSORPTION SYSTEM

[75] Inventor: James Way, Cupertino, Calif.

[73] Assignee: Nitrotec Corporation, New York, N.Y.

[21] Appl. No.: 695,526

[22] Filed: Jan. 28, 1985

[51] Int. Cl.$^4$ .................. B03C 3/14; B01D 53/04
[52] U.S. Cl. .................. 55/5; 55/68; 55/75; 55/107; 55/126; 55/140; 55/389
[58] Field of Search .............. 55/2, 5, 6, 25, 26, 55/58, 62, 68, 75, 107, 124–126, 134, 140, 179, 389

[56] References Cited

U.S. PATENT DOCUMENTS

| | | | |
|---|---|---|---|
| 3,801,513 | 4/1974 | Münzner et al. | 55/75 X |
| 3,923,477 | 12/1975 | Armond et al. | 55/25 |
| 4,011,065 | 3/1977 | Münzner et al. | 55/25 |
| 4,013,429 | 3/1977 | Sircar et al. | 55/58 X |
| 4,015,956 | 4/1977 | Münzner et al. | 55/25 |
| 4,141,697 | 2/1979 | Albanese | 55/5 |
| 4,244,710 | 9/1980 | Burger | 55/6 |
| 4,264,339 | 4/1981 | Jüntgen et al. | 55/25 |
| 4,376,639 | 3/1983 | Vo | 55/58 X |
| 4,440,548 | 4/1984 | Hill | 55/26 |

Primary Examiner—Robert Spitzer
Attorney, Agent, or Firm—Kirschstein, Kirschstein, Ottinger & Israel

[57] ABSTRACT

A method of and an arrangement for increasing the enrichment of nitrogen in an effluent gas obtained from a pressure swing adsorption system includes electrostatically negatively charging oxygen molecules in a feed gas such as air, and attracting the negatively charged oxygen molecules to a positively charged molecular sieve coke material employed as adsorbers in the pressure swing adsorption process.

14 Claims, 3 Drawing Figures

METHOD OF AND ARRANGEMENT FOR ENRICHING THE NITROGEN CONTENT OF AN EFFLUENT GAS IN A PRESSURE SWING ADSORPTION SYSTEM

BACKGROUND OF THE INVENTION

1. Field of the Invention

This invention generally relates to an adsorption system and process and, more particularly, to a pressure swing adsorption system and process of the type wherein a feed gas, e.g. air, composed of oxygen and nitrogen, is loaded in a molecular sieve coke adsorber operative for selectively adsorbing oxygen, and wherein a nitrogen-enriched effluent gas is conveyed from the adsorber, and, yet more particularly, to a method of and arrangement for increasing the enrichment of the nitrogen content of the effluent gas.

2. Description of the Prior Art

Many processes for recovering oxygen and nitrogen from a feed gas such as air are known in the art. For example, for recovering oxygen, one of the chief commercial techniques still in use today is the fractional distillation of liquid air. However, the distillation process is very expensive and requires a major expenditure of capital equipment, and is economically viable only when large commercial plants are built and operated continuously. Small businesses typically cannot afford to build their own fractional distillation plants and, thus, buy liquid oxygen and/or nitrogen directly from the distillation plant.

It also has been proposed to recover both oxygen- and nitrogen-enriched gases utilizing an adsorption process. One type of adsorption process employs silicates, e.g. zeolites, which are effective preferably for adsorbing nitrogen from gas mixtures containing oxygen and nitrogen, so that by conducting a feed gas such as air through a zeolite-filled adsorber, the effluent gas that initially issues from the adsorber effectively is enriched as regards its oxygen content. However, it requires a considerable capital expenditure and considerable energy to regenerate zeolite and, in addition, zeolites are effective only when used with dry air due to their hydrophilic properties. Such air dryers represent still another added expense.

Another type of adsorption process employs carbon-containing molecular sieves of the kind described, for example, in U.S. Pat. Nos. 3,801,513; 3,960,522; 3,960,769 and 3,979,330. Such molecular sieve coke adsorbers have an ultra-fine pore structure wherein the effective average size of the individual pores is less than about 0.3 millimicron. Oxygen gas molecules are smaller, and nitrogen gas molecules are larger, than about 0.3 millimicron. Hence, such molecular sieve coke adsorbers are operative during an initial loading or adsorption phase wherein air is charged to the adsorber selectively to adsorb the oxygen and to discharge a nitrogen-enriched effluent gas therefrom. If the nitrogen-enriched effluent gas is the desired product, i.e. for users requiring nitrogen, then this product gas is collected until its continuously rising oxygen content, i.e. the "impurity", has reached a predetermined limit value. This limit value depends on the purity or concentration of the nitrogen content of the product gas required by a particular user.

Thereupon, the charged molecular sieve coke adsorber is desorbed of the oxygen-enriched residual gas during a subsequent unloading or desorption phase. If the oxygen-enriched residual gas is the desired product, i.e. for users requiring oxygen, then this oxygen-enriched product gas is collected. The alternating adsorption and desorption phases of the abovedescribed adsorption process can be repeated and performed at various pressure changes, or temperature changes, or with one or more vessels in which the molecular sieve coke is contained, to achieve the desired product gas at the desired purity or concentration for either oxygen or nitrogen. For even greater purity, the gas discharged from one vessel can serve as the feed stock for another adsorption vessel. Examples of such processes are described, for instance, in U.S. Pat. Nos. 4,011,065; 4,015,956 and 4,264,339.

As described in the above-identified patents, there were thus obtained very high concentrations of nitrogen in the nitrogen-enriched effluent gas discharged during the loading phase of the pressure swing adsorption system. By way of nonlimiting example, in one particularly advantageous commercial nitrogen-generating system using two alternatingly charged molecular sieve coke adsorbers, the concentration of nitrogen in the nitrogen-enriched effluent gas during the loading phase of each adsorber was on the order of 97.0% through 99.9% nitrogen, depending on such factors as the flow rate of the effluent gas out of the respective adsorber, and the dwell time of the gases within the respective adsorber. The slower the flow rate and the higher the dwell time, the higher the concentration of nitrogen in the effluent gas. However, unless the flow rates were brought down to unacceptably slow, and therefore commercially undesirable, levels on the order of less than about 750 standard cubic feet per hour, and unless the dwell times similarly were brought down to unacceptably long, and therefore also commercially undesirable, levels on the order of over 120 seconds, then the nitrogen concentration thus achieved typically was not higher than 99.9% nitrogen which, although very desirable for the majority of applications, still was not suitable for some applications which required even higher nitrogen purities.

In the semiconductor chip manufacturing industry, an inert nitrogen atmosphere is required for heat-treating the chips in a furnace, and typically the desired nitrogen atmosphere is on the order of 99.999% nitrogen, or, in other words, the total oxygen content per unit volume of the effluent gas is about 5 parts per million. To obtain such high nitrogen purity levels is difficult in commercial distillation plants, and is, of course, expensive.

As for the molecular sieve coke adsorbers which, by contrast to commercial distillation plants, are small-scale systems, such purity levels in excess of 99.9% nitrogen are not readily commercially available, although it has been proposed to inject hydrogen gas into the 99.9% nitrogen content of an effluent gas prior to passing the resulting mixture through a heated palladium catalyst, so that the residual oxygen (on the order of 0.1% oxygen) in the effluent gas would react with the injected hydrogen and produce water which subsequently is to be removed downstream of the catalyst. Although generally satisfactory for its intended purpose of producing product gases having a nitrogen concentration in excess of 99.9% nitrogen in the effluent gas, the above-described catalyst-assisted process has not proven to be altogether convenient in use or commercially viable, particularly in small-scale systems. For example, one drawback with the catalyst-assisted process is that the hydrogen to be injected upstream of the catalyst is not readily available, and would have to be separately purchased since it is not a by-product of the pressure swing adsorption process. The palladium catalyst and the subsystem for heating the same represents still another system complexity and expense. As for the water that is produced, it must be gotten rid of, typically by employing an air dryer such as zeolite. The dryer, of course, represents still another system complexity and expense and, to aggravate matters, the zeolite periodically must be regenerated. The energy consumption required to generate nitrogen-enriched effluent gases with nitrogen concentrations in excess of 99.9% is high and, even for the catalyst-assisted process, represents still another expenditure of energy which it is desired to minimize.

SUMMARY OF THE INVENTION

1. Objects of the Invention

It is a general object of the present invention to overcome the drawbacks of prior art adsorption systems wherein very high concentrations of nitrogen are desired.

It is another object of the present invention to increase the nitrogen concentration of a nitrogen-enriched effluent gas in an adsorption system, particularly a pressure swing adsorption system using molecular sieve coke adsorbers, to a value in excess of 99.9% nitrogen, and especially to values on the order of 99.999% nitrogen.

It is a further object of the present invention to increase the nitrogen concentration of the effluent gas without employing an expensive and complex nitrogen-recovery process.

It is still another object of the present invention to increase the nitrogen concentration of the effluent gas using a small-scale system suitable for small businesses.

It is yet another object of the present invention to provide a nitrogen-enrichment arrangement and method which are inexpensive in operation, require minimal expenditures of energy, are reliable, and can produce high nitrogen concentrations in excess of 99.9% nitrogen even with a single-stage process in which a single vessel containing molecular sieve coke is employed.

It is another object of the present invention to increase the oxygen concentration of an oxygen-enriched desorption gas in an adsorption system, particularly a pressure swing adsorption system utilizing molecular sieve coke, to values well in excess of that commonly found in air.

2. Features of the Invention

In keeping with these objects and others which will become apparent hereinafter, one feature of the invention, briefly stated, resides in an adsorption process and system of the type wherein a feed gas comprised of two components is loaded in an adsorber selectively operative for adsorbing one of the components, and an effluent gas enriched in the other of the components is conveyed from the adsorber, and, more particularly, in a method of and arrangement for increasing the enrichment of said other component contained in the effluent gas.

Still more particularly, in an advantageous embodiment of this invention, the feed gas is air, which is comprised of oxygen, nitrogen, argon and other residual gases, and the adsorber constitutes a multitude of molecular sieve coke granules or pellets contained in a vessel. The molecular sieve coke adsorber selectively is operative for adsorbing oxygen as said one component, and for enriching the effluent gas with nitrogen as said other component. Hence, the method and arrangement in accordance with this invention is particularly well suited for increasing the enrichment of the nitrogen content contained in the effluent gas discharged from the molecular sieve coke adsorber, preferably in a pressure swing adsorption system.

The invention resides in differentially electrostatically charging the two components of the feed gas electrostatically to charge said one component, i.e. oxygen, greater than said other component, i.e. nitrogen, with a charge having a first polarity, e.g. a negative charge. In addition, the invention resides in electrostatically charging the adsorber during loading thereof with a charge having a second, opposite polarity, e.g. a positive charge. Hence, during the loading of the air into the molecular sieve coke adsorber, the greater negatively charged oxygen electrostatically is attracted to the opposite positively charged adsorber. The attraction of the oxygen to the adsorber enhances the adsorption effect and, therefore, increases the enrichment of the effluent gas with nitrogen to values in excess of 99.9% nitrogen.

In addition, when the adsorber is desorbed during a subsequent unloading phase, this invention further proposes oppositely electrostatically charging the adsorber during the desorption thereof with a charge having said first polarity, i.e. with a negative charge, while said one component, i.e. oxygen, remains charged with said same negative charge. Thereby, the negatively charged oxygen electrostatically is repelled from the same negatively charged adsorber during the unloading or desorption thereof and, thus, the evacuation of the adsorber is enhanced and is made ready for the next adsorption phase. In effect, the desorption gas is enriched with oxygen to an extent greater than that normally found in air.

In a currently preferred arrangement in accordance with this invention, an electrical voltage supply on the order of 10,000 to 20,000 volts DC is provided. A dielectric-coated field mesh overlies an inlet of the vessel in which the molecular sieve coke is contained, and at least a portion of the molecular sieve coke is supported on the mesh. The mesh has apertures through which the air entering the vessel inlet is conveyed. The arrangement further comprises a plurality of dielectric-coated field rods electrically connected to the mesh and extending therefrom through the molecular sieve coke adsorber surrounding the rods in a direction toward an outlet of the vessel. Means are provided for electrically connecting a negative output of the aforementioned voltage supply to the rods and the mesh for the purpose of electrostatically negatively charging the oxygen present in the circumambient region of the rods and the mesh to a greater extent than the nitrogen is charged. Means also are provided for electrically connecting a positive output of the voltage supply to the vessel during the loading phase for the purpose of electrostatically positively charging the vessel and the molecular sieve coke contained within, and electrically conductive with, the same.

The negatively charged oxygen thus electrostatically is attracted to the positively charged molecular sieve coke to increase the enrichment of the nitrogen in the effluent gas discharged during the loading phase, and purities in excess of 99.9% nitrogen in the effluent gas are achieved thereby.

In addition, means are provided for electrically connecting the negative output of the voltage supply to the vessel during the unloading phase for the purpose of electrostatically negatively charging the molecular sieve coke adsorber while the oxygen remains negatively charged. The negatively charged oxygen electrostatically is repelled from the negatively charged molecular sieve coke adsorber during this unloading phase, and purities in excess of 21% oxygen in the desorption gas are achieved thereby.

The above-described electrostatic arrangement and method for more effectively separating oxygen and nitrogen from air is inexpensive to run, does not require a high expenditure of energy, and can be performed at commercially acceptable flow rates of the effluent gas, and at commercially acceptable dwell times in the adsorption vessels, thereby to achieve a very highly nitrogen-enriched gas in small-scale production, which is of particular advantage to small businesses.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

BREIF DESCRIPTION OF THE DRAWINGS

DETAILED DESCRIPTION OF THE PREFERRED EMBODIMENT

Figure 1:
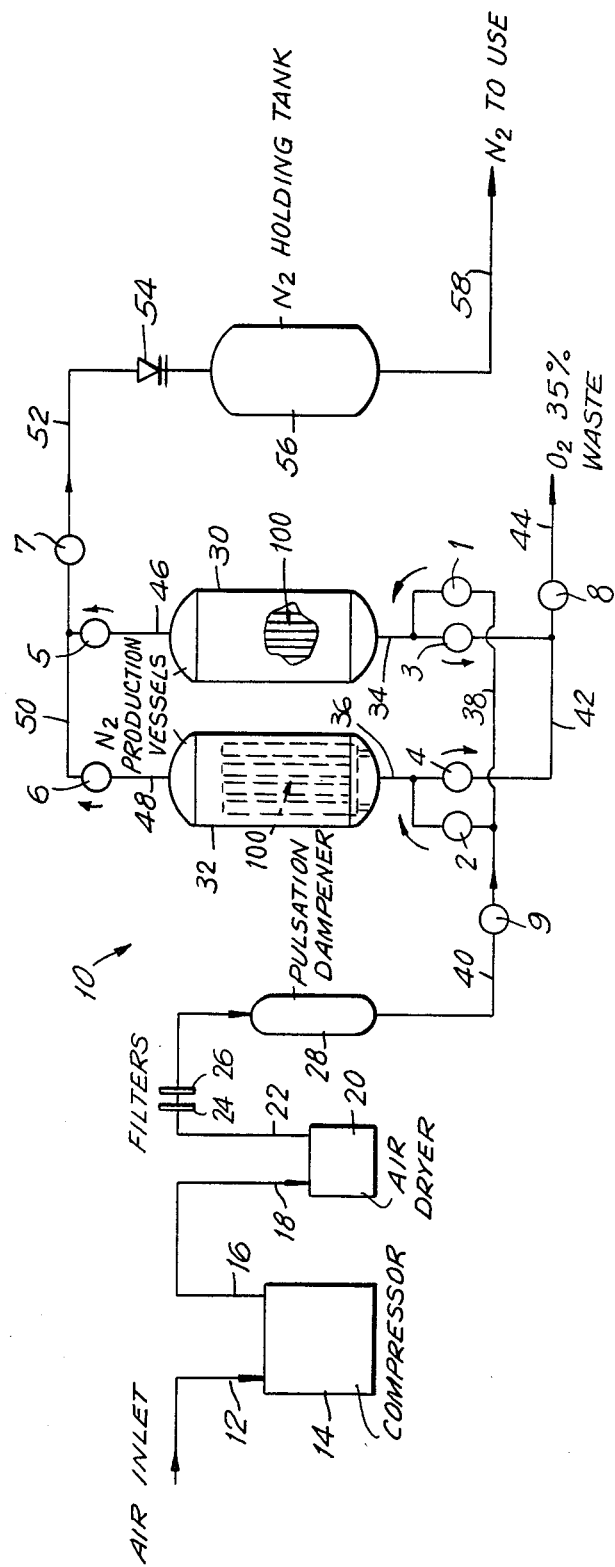
FIG. 1 is a diagrammatic view of a pressure swing adsorption system having a pair of alternately loaded and unloaded vessels, each of which contains the arrangement for increasing the enrichment of the nitrogen content in the effluent gas in accordance with the method of this invention.

Referring now to the drawings and, more particularly, to FIG. 1, reference numeral 10 generally identifies a pressure swing adsorption system of the type wherein a feed gas, for example, air, comprised of nitrogen, oxygen, argon and other components, is admitted in an air inlet 12 of a compressor 14. The compressor 14 compresses the air and conveys the pressurized air through an air outlet 16 into an inlet 18 of an air dryer 20. The dryer 20 dries the air and removes moisture therefrom, and conveys the pressurized dried air through an outlet 22 and through a pair of filters 24, 26. The filters 24, 26 clean the air, and the cleaned air thereupon is conveyed through a pulsation dampener device 28. The device 28 is operative for dampening any vibrations or pulsations that may be present in the air flow in order to condition the same to be laminar and continuous.

Thereupon, the air, which has been pressurized, dried, filtered and dampened, is conveyed along a flow path in a manner described below, through an inlet valve system to a pair of adsorption vessels 30, 32, each of which is filled with an adsorber. The inlet valve system comprises a pair of inlet valves 1, 2 whose downstream ends, as considered in the direction of the air flow into the vessels 30, 32, respectively are connected to a pair of inlets 34, 36 of vessels 30, 32. The upstream ends of inlet valves 1, 2 are connected to each other at opposite ends of a common conduit 38. The air flow from the dampener device 28 is conveyed along a feed conduit 40 through a feed valve 9 to the common conduit 38.

The inlets 34, 36 also respectively are connected to upstream ends, as considered in the direction of outflow from the vessels 30, 32, of desorption valves 3, 4 whose opposite downstream ends are connected together at opposite ends of a common conduit 42. The common conduit 42 is connected to a discharge conduit 44 in which a discharge valve 8 is located.

An outlet valve system is located at a pair of outlets 46, 48 of the vessels 30, 32. The outlet valve system comprises a pair of outlet valves 5, 6 whose upstream ends, as considered in the direction of outflow from the vessels 30, 32, respectively are connected to outlets 46, 48, and whose downstream ends are connected together at opposite ends of a common conduit 50. The common conduit 50 is connected to a product discharge conduit 52 in which a valve 7 is located.

The valves 1 through 8 of the inlet and outlet valve systems preferably are solenoid valves which are electronically controlled, preferably by a non-illustrated microprocessor unit which is operative to open and/or close the respective valves at predetermined times for predetermined time periods and in a predetermined sequence, as described in detail below. The feed valve 9 preferably is a manually-operable valve which manually is opened and which remains open during the entire operating cycle of the pressure swing adsorption system and, hence, need not, but if desired, could be, controlled by the microprocessor.

The system further comprises a throttle or back pressure valve 54 which is, preferably, although not necessarily, manually operated. The throttle 54 has a throat which is adjustably openable to a predetermined effective size to create a predetermined backpressure for the gases within, and discharged from, the vessels 30, 32. A holding tank or reservoir 56 is connected at the downstream end of the throttle 54, and is operative to store a product gas prior to discharging the same through a product discharge conduit 58.

Before describing the operating cycle of the pressure swing adsorption system of FIG. 1 in detail, it should be noted that the adsorber contained within the vessels 30, 32 preferably is molecular sieve coke prepared in accordance with the teachings of U.S. Pat. Nos. 3,801,513; 3,960,522; 3,960,769 and 3,979,330. The thus-prepared molecular sieve coke has an ultrafine pore structure whose individual pores have an average effective size of less than about 0.3 millimicron, which is greater than the average size of an oxygen molecule but smaller than the average size of a nitrogen molecule, in order to achieve the selective adsorption of oxygen within the sieve. In general terms, when air is conveyed into a vessel having molecular sieve coke, the oxygen molecules in the air selectively are adsorbed within the sieve, whereas the nitrogen molecules, as well as the other trace gases and other components in the air, are not adsorbed, and are, in fact, discharged from and past the sieve. The conveying of air, particularly under pressure, to the molecular sieve is known as the loading or adsorption phase, wherein the sieve becomes increasingly charged with the selectively adsorbed oxygen. During this loading phase, the effluent gas enriched with nitrogen, which is discharged from the sieve, starts out as having a very small oxygen content, and then, as the loading continues, the sieve becomes more and more loaded with oxygen, so that the oxygen content of the effluent gas continuously rises and eventually reaches a predetermined value which generally is determined by a user for the particular application.

At this point, further loading of the sieve is terminated, and the sieve then is desorbed of the residual gases within the sieve and the vessel, said residual gases being enriched with oxygen. This latter step is known as the unloading or desorption phase and, upon the completion of the desorption phase, the evacuated sieve then can again be loaded.

The aforementioned adsorption and desorption phases can be performed in a single vessel, in a so-called single-stage process, or can be alternatingly performed in a pair of vessels wherein adsorption is performed in one vessel while desorption is performed in the other, and vice versa, in a so-called two-stage process which provides for a more continuous production of effluent gas, as compared to the one-stage process.

In starting up the pressure swing adsorption system of FIG. 1, it first is necessary to equalize or balance the pressures between vessels 30, 32. This is accomplished by opening valves 3, 4 and valves 5,6 for about one second so that the vessels 30, 32 can be pressure-equalized across their inlets 34, 36 and their outlets 46, 48 through common conduits 42, 50, respectively. All other valves, except for feed valve 9 which remains open throughout the entire operation, are closed during this equalization step.

The next step is to bring one of the vessels, e.g. vessel 32, up to pressure by admitting pressurized air therein. This is accomplished by opening inlet valve 2, closing inlet valve 1, opening outlet valve 6, and closing desorption valve 4. The compressor 14 is running, at this time, and supplying pressurized air through opened feed valve 9 at an initial rate of about 120 cubic feet per minute, and at about 100 cubic feet per minute in steady state operation. After about 4 seconds, the pressure within vessel 32 rises to about 60 psi. While the vessel 32 is being brought up to said pressure, the vessel 30, as described below, is being desorbed and, hence, desorption valve 3 and discharge valve 8 are opened, and outlet valve 5 and discharge valve 7 are closed.

The next step is to run, i.e. load, the sieve in vessel 32. This is accomplished by opening discharge valve 7 so that the nitrogen-enriched effluent gas discharged from vessel 32 is conducted under pressure to the tank 56 and stored therein until needed by the user. The discharge valve 7 remains open for about 55 seconds. The throttle 54 partly is opened to create a back pressure for the nitrogen-enriched effluent gas discharged from vessel 32. At the end of the 55-second loading interval, and with the compressor 14 still operating at about 100 cubic feet per minute, the pressure within vessel 32 rises to about 100 psi.

The next step is to equalize or pressure balance the vessels 30, 32 again. As before, this is accomplished by opening valves 3, 4 and 5,6, and closing of the other valves (except for feed valve 9) for about one second. This equalization step causes the pressure in vessel 32 to decrease from its initial value of 100 psi to a final value of about 50 psi.

The next step is to bring vessel 30 up to pressure by admitting pressurized air therein. This is accomplished by opening inlet valve 1, closing inlet valve 2, opening outlet valve 5, and closing desorption valve 3. After about 4 seconds, the pressure within vessel 30 rises from an initial value of about 50 psi to a final value of about 60 psi. While the vessel 30 is being pressurized, the vessel 32 starts being desorbed, as described below, and, for this purpose, desorption valve 4 and discharge valve 8 are opened, and outlet valve 6 and discharge valve 7 are closed.

The next step is to run, i.e. load, the sieve in vessel 30. This is accomplished by opening discharge valve 7 so that the nitrogen-enriched effluent gas discharged from vessel 30 is conducted under pressure to the tank 56 and stored therein for later use. The discharge valve 7 remains open for about 55 seconds and, analogously to the loading step described above for vessel 32, the pressure within vessel 30 rises to about 100 psi.

As noted above, the vessel 32 is being desorbed, not only during the 4-second period that the pressurized air is being admitted into vessel 30, but also during the 55-second period that vessel 30 is being loaded. The pressure of about 50 psi in vessel 32 suddenly is reduced to about zero or atmospheric pressure due to the sudden opening of the desorption valve 4 and the discharge valve 8 which enable the oxygen-enriched desorption gas within the vessel 32 to escape and be discharged through discharge conduit 44. To assist the desorption, it sometimes is desirable to add a vacuum pump in the discharge conduit 44 to ensure that the sieve in vessel 32 completely is evacuated. Since, in a preferred embodiment, oxygen is the waste gas and nitrogen is the desired product gas, the oxygen-enriched desorption gas can be vented to the atmosphere. On the other hand, if oxygen-enriched gas is useful to the user, the desorption gas can be stored or used as desired.

The next step in the operation of the pressure swing adsorption system is to pressure-balance the vessels 32, 30 yet again and, thereupon, to repeat the above-described steps wherein vessel 30 is loaded while vessel 32 simultaneously is desorbed and, thereupon, vessel 32 is loaded while vessel 30 simultaneously is desorbed.

The aforementioned pressure swing adsorption system has been built with vessels 30, 32 having a generally cylindrical configuration, and being about 188 cm high, and having a diameter of about 76 cm. The molecular sieve coke fills virtually the entire inner volume of each container, and preferably is a bed constituted as cylindrical pellets or analogously-shaped bodies of about 20 mm in length. Typical test data for the FIG. 1 system indicate that when the volume of the nitrogen-enriched effluent gas discharged from the tank 56 is about 3400 standard cubic feet per hour, 1400 standard cubic feet per hour, and 750 standard cubic feet per hour, the purity, i.e. concentration, of the nitrogen content of said effluent gas is about 97.0% nitrogen, about 99.5% nitrogen, and about 99.9% nitrogen, respectively, at respective energy consumption levels of about 35.5 HP, about 26 HP and about 22 HP. Although such nitrogen purities are useful for the vast majority of applications, even greater nitrogen purities are desired in the semiconductor chip manufacturing industry, as well as other industries, as described above. To achieve purities in excess of 99.9% nitrogen, this invention proposes an enhancement to the pressure swing adsorption system of FIG. 1 by proposing a method of and an arrangement for increasing the enrichment of the nitrogen content of the effluent gas.

Figure 2:
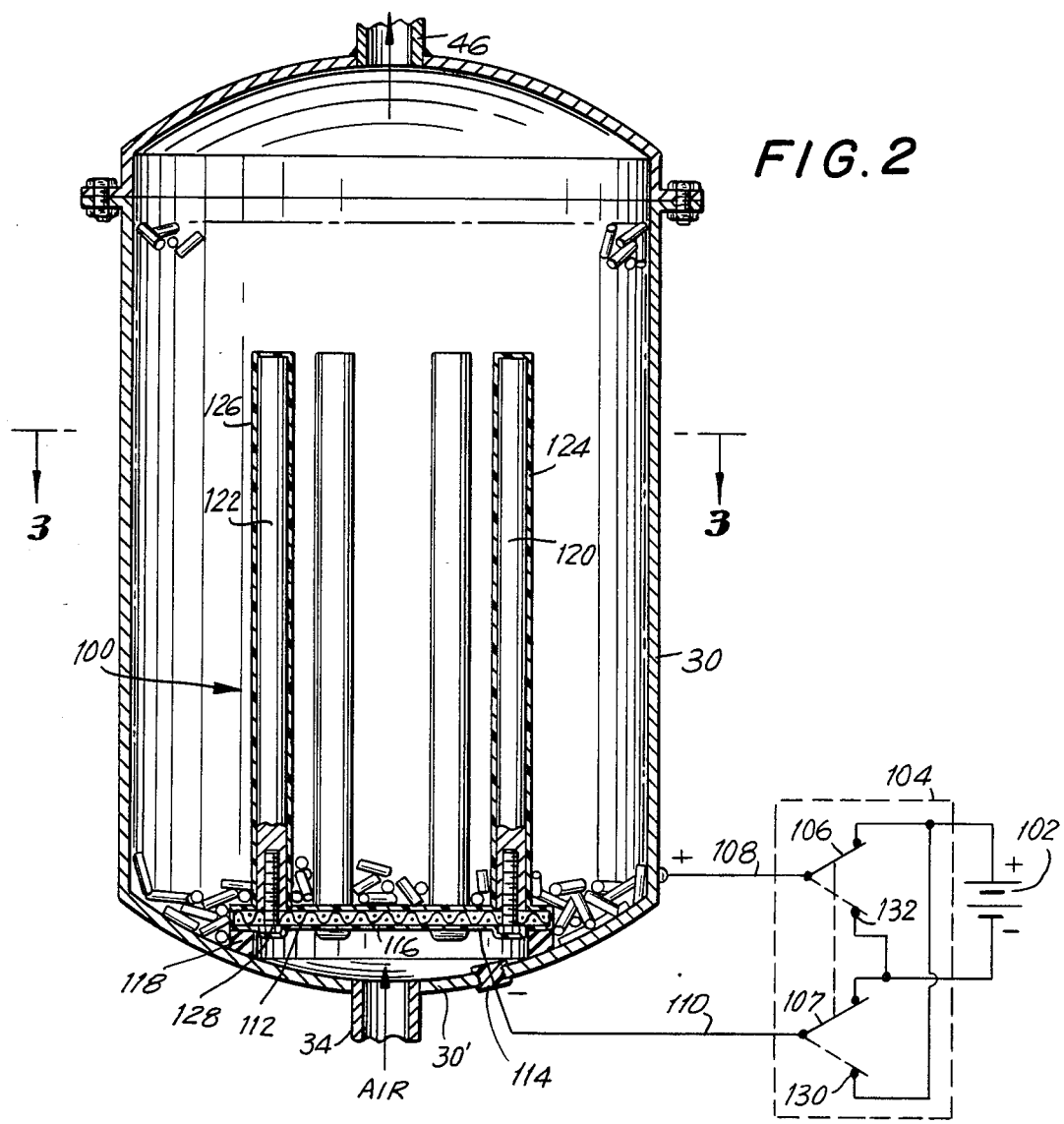
FIG. 2 is a partially sectioned, partially schematic enlarged view of one of the vessels of FIG. 1 showing the arrangement in accordance with this invention.

Turning, then, to FIG. 2, such an arrangement 100 advantageously comprises an electrical high-voltage supply 102 whose output DC voltage is about 10,000 to 20,000 volts. The voltage supply 102 is connected to a reversing switch 104, preferably a pair of slaved-together, double-pole, double-throw switches 106, 107. When the switches 106, 107 are thrown to the position shown in FIG. 2 in solid lines, the positive terminal of voltage supply 102 electrically is connected through a conductor 108 to a side wall of representative vessel 30. The conductor 108 preferably is welded to the exterior of the side wall of vessel 30 which is constituted of an electrically-conductive material such as metal. Since the interior of the vessel 30 is closely packed and filled with the molecular sieve coke which, like the vessel 30, constitutes an electrically-conductive material, the positive terminal of voltage supply 102 is, in effect, electrically connected to the molecular sieve coke pellets within the vessel 30, and is operative to impart a positive electrostatic charge thereto.

As for the negative terminal of voltage supply 102, it is electrically connected through switch 107 and by a conductor 110 to a field mesh 112 located within the vessel adjacent the air inlet 34. In a preferred construction, the conductor 110 is routed through an electrically-insulating plug 114 whose exterior has a thread which meshingly engages a threaded hole formed in a bottom wall 30' of vessel 30. The conductor 110 preferably is welded to the mesh 112 which typically is constituted of an electrically-conductive material such as metal. The mesh 112 overlies the air inlet 34, and is apertured to permit the incoming air to be conveyed through the apertures. The apertures in the mesh are not so large as to permit the molecular sieve coke pellets supported above the same to fall through the apertures. The mesh itself is coated with a dielectric material 116, preferably an electrically-insulating plastic material. In addition, a spacer ring 118 of dielectric plastic material is located about the periphery of the mesh 112 between the same and the bottom wall 30'. The ring 118 and the dielectric material 116 serve to electrically isolate the mesh 112 from the positively charged walls of the vessel 30. Hence, the negative terminal of the voltage supply 102 in the illustrated solid-line position of switch 107 directly is connected to the mesh 112 and is operative for imparting a negative electrostatic charge thereto. An electrostatic field thus is established between the vessel walls and the molecular sieve coke pellets, on the one hand, and the field mesh 112, on the other hand.

As air passes through the negatively charged dielectric-coated mesh 112 during the loading of the molecular sieve coke pellets, the oxygen molecules in the air in the vicinity of the mesh are negatively charged or ionized to a greater extent than the nitrogen molecules in the incoming air in the same vicinity. If the strength of the electrostatic field is kept below a threshold value by, for example, decreasing the voltage of the voltage supply 102 to a predetermined value, then the nitrogen molecules in the incoming air hardly will ionize at all, and only the oxygen molecules will be ionized due to the more easily ionizable characteristic of the oxygen molecules.

Once the negatively charged oxygen molecules differentially are ionized to a higher degree, as compared to the nitrogen molecules, the greater negatively charged oxygen molecules electrostatically are attracted to the positively charged molecular sieve coke pellets. This electrostatic attraction enhances the separation between the oxygen and nitrogen molecules, and increases the purity of the nitrogen content of the effluent gas discharged from the outlet 46. Nitrogen concentrations in excess of 99.9% and, in some cases, up to 99.999% nitrogen, thus are obtainable without relying on the aforementioned catalyst-assisted processes of the prior art.

During the loading of the molecular sieve coke pellets, the electrical current flowing through conductors 108, 110 increases from an initial value of about 0.1 microamp due to the high resistance of the sieve coke pellets, to a final value on the order of about one milliamp due to the lowering of the resistance of the coke because of the presence of adsorbed oxygen therein.

Figure 3:
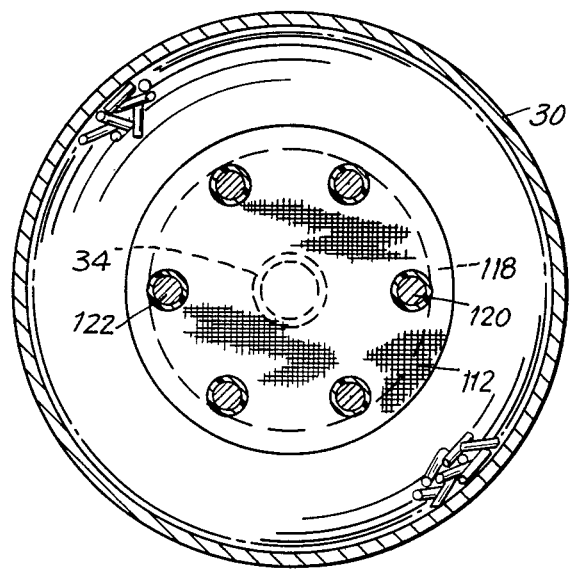
FIG. 3 is a cross-sectional view taken on line 3—3 of FIG. 2.

To enhance the above-described electrostatic action, a plurality of elongated field terminals or rods, e.g. see representative rods 120, 122, are positioned within the pellets and surrounded, at least in part, by the same. The rods are made of an electrically-conducting material such as metal, and are coated with a dielectric electrically-insulating plastic coating, e.g. see coatings 124, 126 on rods 120, 122, respectively. One end of each rod electrically is connected to the mesh 112 and is anchored in an upright position thereto by a threaded bolt, e.g. bolt 128, extending through the mesh and threaded into a tapped bore in the end of the respective rod. Each rod extends from the inlet 34 toward, and preferably terminating short of, the outlet 46 of the vessel 30. In addition, the rods may be equiangularly spaced in the circumferential direction about the axis of symmetry of the vessel 30, as best shown in FIG. 3. The rods, just like the mesh, thus are negatively charged due to their electrical connection to the negative terminal of the voltage supply 102. The rods, in effect, present a larger negatively charged surface area for ionizing oxygen molecules located within the interior of the molecular sieve coke bed. The rods are spaced at a plurality of locations through the molecular sieve coke bed, and serve electrostatically to attract the negatively charged oxygen molecules, even when the latter have passed the mesh 112.

In an alternative construction, rather than positioning a plurality of rods in upright orientation through the molecular sieve coke bed, a plurality of generally planar meshes, analogous to field mesh 112, could be located at various elevations in the coke bed. The meshes would be electrically connected to one another, and would lie in mutually parallel planes.

The electrostatic action described above is generated during the adsorption performed by each molecular sieve coke contained in a respective vessel. During the desorption phase of each respective vessel, the pressure difference between that within the vessel and that of the area to which the desorption gases are vented is sufficient to strip the oxygen molecules from the molecular sieve coke, and to counteract the electrostatic attraction thereat. Nevertheless, it may be desirable, in certain circumstances, to aid in the removal of the oxygen from the molecular sieve coke by oppositely negatively charging the molecular sieve coke for a short time, while the oxygen molecules remain negatively charged, thereby electrostatically to repel the oxygen molecules from the negatively charged sieve coke. To accomplish this, switch contacts 130, 132 of the reversing switch 104 slightly are staggered such that the armature of switch 106 makes contact with contact terminal 132 a short time interval before the armature of switch 107 makes contact with the contact 130. Advantageously, the switches 106, 107 are "break-before-make" switches.

The arrangement shown in FIGS. 2 and 3 is provided for each vessel 30, 32, and alternatingly is operated in accordance with the adsorption and desorption phases of the pressure swing adsorption system. The method and arrangement in accordance with this invention virtually is maintenance-free, extremely cost-effective, and energy-efficient.

Although the above-described method and arrangement have been discussed in connection with nitrogen as the product gas and oxygen as the waste gas, it expressly will be understood that, in certain applications, oxygen may be the desired product gas and nitrogen the waste gas. If oxygen is the desired product gas, then, during the desorption step, the purity or concentration of the oxygen content of the desorption gases will be in excess of the 21% oxygen concentration normally found in air and, in certain cases, can be as high as 35%–40%.

It will be understood that each of the elements described above, or two or more together, may also find a useful application in other types of constructions differing from the types described above.

While the invention has been illustrated and described as embodied in a method of and arrangement for enriching the nitrogen content of an effluent gas in a pressure swing adsorption system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. In an adsorption process of the type wherein a feed gas comprised of two components is loaded in an adsorber operative for selectively adsorbing one of the components, and an effluent gas enriched in the other of the components is conveyed from the adsorber,
   a method of increasing the enrichment of said other component contained in the effluent gas, comprising the steps of:
   (a) differentially electrostatically charging the two components of the feed gas to electrostatically charge said one component greater than said other component with a charge having a first polarity; and
   (b) electrostatically charging the adsorber during loading thereof with a charge having a second opposite polarity, thereby electrostatically to attract said greater charged one component to said oppositely charged adsorber during the loading thereof.

2. In the adsorption process as defined in claim 1, wherein an unloaded gas enriched in said one selectively adsorbed component is unloaded from the adsorber, the method further comprising the step of oppositely electrostatically charging the adsorber during unloading thereof with a charge having said first polarity while said one component remains charged with a charge of said same first polarity, thereby electrostatically to repel said charged one component from said same charged adsorber during the unloading thereof.

3. The method as defined in claim 1, wherein said differentially charging step includes the steps of positioning a dielectric-coated field terminal in an electrically-conductive vessel in which the adsorber is contained and electrically connecting an output of an electrical high constant voltage source to the field terminal, and wherein said adsorber charging step includes electrically connecting another output of the electrical high constant voltage source to the vessel.

4. The method as defined in claim 3, wherein said positioning step includes locating the field terminal within the adsorber and for a predetermined distance lengthwise of the same.

5. The method as defined in claim 4, wherein said positioning step includes locating a plurality of additional field terminals, all electrically connected to one another, at spaced-apart locations within the adsorber.

6. In the adsorption process as defined in claim 1 of the pressure swing adsorption type, wherein the feed gas is air; and wherein the adsorber constitutes a multitude of molecular sieve coke pellets contained in a vessel, and operative for selectively adsorbing oxygen as said one component, and for enriching the effluent gas with nitrogen as said other component, the method wherein the effluent gas is enriched with nitrogen to an amount greater than that obtained by the adsorber alone.

7. In an adsorption system of the type wherein a feed gas comprised of two components is loaded in an adsorber operative for selectively adsorbing one of the components, and an effluent gas enriched in the other of the components is conveyed from the adsorber, an arrangement for increasing the enrichment of said other component contained in the effluent gas, comprising:
   (a) means for differentially electrostatically charging the two components of the feed gas to electrostatically charge said one component greater than said other component with a charge having a first polarity; and
   (b) means for electrostatically charging the adsorber during loading thereof with a charge having a second opposite polarity, thereby electrostatically to attract said greater charged one component to said oppositely charged adsorber during the loading thereof.

8. In the adsorption system as defined in claim 7, wherein an unloaded gas enriched in said one selectively adsorbed component is unloaded from the adsorber, the arrangement further comprising means for oppositely electrostatically charging the adsorber during unloading thereof with a charge having said first polarity while said one component remains charged with a charge of said same first polarity, thereby electrostatically to repel said charged one component from said same charged adsorber during the unloading thereof.

9. In the adsorption system of claim 7 of the pressure swing adsorption type wherein the feed gas is air; and wherein the adsorber constitutes a multitude of molecular sieve coke pellets contained in an electrically-conductive vessel, and operative for selectively adsorbing oxygen as said one component and for enriching the effluent gas with nitrogen as said other component, the arrangement wherein said differentially charging means includes an electrical voltage supply having a high constant voltage across a pair of outputs; a dielectric-coated field terminal means positioned in and surrounded, at least in part, by the pellets; and means for electrically connecting one output of the voltage supply to the field terminal means; and wherein said electrostatically charging means includes means for electrically connecting the other output of the voltage supply to the vessel.

10. The arrangement as defined in claim 9, wherein the differentially charging means negatively charges the oxygen, and the electrostatically charging means positively charges the vessel and, in turn, the pellets contained therein during the loading.

11. The arrangement as defined in claim 9, wherein the field terminal means comprises at least one elongated dielectric-coated metallic rod extending lengthwise along and in the vessel, said rod being surrounded, at least partially, by the pellets within the vessel.

12. The arrangement as defined in claim 9, wherein the field terminal means comprises a dielectric-coated mesh which is located adjacent an air inlet of the vessel and which has apertures through which the air passes, and a plurality of elongated dielectric-coated metallic rods electrically connected to the mesh and extending therefrom toward an outlet of the vessel; said mesh and rods being surrounded, at least in part, by the pellets in the vessel.

13. In a pressure swing adsorption system of the type wherein, during a loading phase, air is conveyed through an inlet of an electrically-conductive vessel in which is contained a multitude of molecular sieve coke pellets operative for selectively adsorbing oxygen from the air, and an effluent gas enriched in nitrogen from the air is conveyed through an outlet of the vessel and, during a subsequent unloading phase, an unloaded gas enriched with the selectively adsorbed oxygen is unloaded through the outlet of the vessel, an arrangement for increasing the enrichment of the nitrogen contained in the effluent gas, comprising;

(a) an electrical voltage supply having a negative output and a positive output across which a high constant voltage is present;
(b) a dielectric-coated field mesh overlying the inlet of the vessel and on which at least a portion of the pellets are supported, said mesh having apertures through which the air is conveyed;
(c) a plurality of dielectric-coated field rods connected to the mesh and extending therefrom through the multitude of the pellets surrounding the rods toward the outlet of the vessel;
(d) means for electrically connecting the negative output of the voltage supply to the rods and the mesh for electrostatically negatively charging the oxygen in the circumambient region of the rods and mesh to a greater extent than the nitrogen;
(e) means for electrically connecting the positive output of the voltage supply to the vessel during the loading phase for electrostatically positively charging the vessel and the pellets contained within the same, thereby electrostatically to attract the negatively charged oxygen to the positively charged pellets during the loading phase to increase the enrichment of the nitrogen in the effluent gas; and
(f) means for electrically connecting the negative output of the voltage supply to the vessel during the unloading phase for electrostatically negatively charging the pellets while the oxygen remains negatively charged, thereby electrostatically to repel the negatively charged oxygen from the negatively charged pellets during the unloading phase.

14. In the system as defined in claim 13, wherein the effluent gas has a purity of about 99.9% nitrogen due to the action of the molecular sieve coke pellets, and wherein the arrangement is operative for increasing the purity of the effluent gas to over 99.9% nitrogen.

* * * * *